United States Patent
Kambe

(10) Patent No.: US 7,902,273 B2
(45) Date of Patent: Mar. 8, 2011

(54) HALOGEN-FREE RESIN COMPOSITION, INSULATED ELECTRIC WIRE, AND WIRE HARNESS

(75) Inventor: Makoto Kambe, Susono (JP)

(73) Assignee: Yazaki Corporation, Tokyo (JP)

( * ) Notice: Subject to any disclaimer, the term of this patent is extended or adjusted under 35 U.S.C. 154(b) by 133 days.

(21) Appl. No.: 12/035,464

(22) Filed: Feb. 22, 2008

(65) Prior Publication Data

US 2008/0234419 A1 Sep. 25, 2008

(30) Foreign Application Priority Data

Mar. 22, 2007 (JP) ............................. 2007-075144

(51) Int. Cl.
- *C08K 3/22* (2006.01)
- *C08K 5/13* (2006.01)
- *C08K 5/16* (2006.01)
- *H01B 3/44* (2006.01)
- *H01B 17/62* (2006.01)

(52) U.S. Cl. ........................ 523/173; 524/189; 524/291; 524/430; 174/137 A; 174/137 B; 174/110 R

(58) Field of Classification Search ................. 523/173; 524/189, 291, 430; 174/137 A, 137 B
See application file for complete search history.

(56) References Cited

U.S. PATENT DOCUMENTS

| | | | |
|---|---|---|---|
| 3,833,539 A * | 9/1974 | Anderson | 524/208 |
| 5,017,637 A * | 5/1991 | Smith et al. | 524/354 |
| 6,414,059 B1 * | 7/2002 | Kobayashi et al. | 524/101 |
| 6,756,440 B2 * | 6/2004 | Hase et al. | 524/515 |
| 2002/0111411 A1 | 8/2002 | Hase et al. | |
| 2003/0059613 A1 * | 3/2003 | Tirelli et al. | 428/375 |
| 2003/0217864 A1 * | 11/2003 | Ishikawa et al. | 174/135 |
| 2006/0100313 A1 * | 5/2006 | Tanaka et al. | 523/205 |
| 2007/0155883 A1 * | 7/2007 | Sato et al. | 524/420 |
| 2008/0053342 A1 * | 3/2008 | Muirhead | 108/57.25 |
| 2009/0124743 A1 * | 5/2009 | Lee | 524/414 |

FOREIGN PATENT DOCUMENTS

| | | |
|---|---|---|
| DE | 19941181 A1 | 5/2000 |
| JP | 2006-83328 A | 3/2006 |

OTHER PUBLICATIONS

Office Action dated Sep. 20, 2010 from a German patent office in a German counterpart application No. 10 2008 011 146.5-43.

* cited by examiner

*Primary Examiner* — Tae H Yoon
(74) *Attorney, Agent, or Firm* — Sughrue Mion, PLLC

(57) ABSTRACT

Disclosed are a halogen-free resin composition, an insulated electric wire, and a wire harness, which can maintain long-term thermal resistance without decreasing established mechanical properties, flame retardancy, flexibility, and the like even when the insulated electric wire coated with the halogen-free resin composition is used in a state where it is mixed with an insulated electric wire coated with a PCV resin composition.

3 Claims, No Drawings

HALOGEN-FREE RESIN COMPOSITION, INSULATED ELECTRIC WIRE, AND WIRE HARNESS

FIELD OF THE INVENTION

The present invention relates to a halogen-free resin composition, an insulated electric wire wherein a conductor is coated with the halogen-free resin composition, and a wire harness.

BACKGROUND ART

As conventional materials for automobiles, particularly insulated electric wires to be cabled in the interior, there have been frequently used those wherein a conductor such as a copper wire is coated with a resin composition based on polyvinyl chloride resin (hereinafter, referred to as "PCV resin composition" herein). The polyvinyl chloride resin has excellent material properties that flame retardancy is high since it is a self-extinguishing material, hardness can be freely controlled by adding a plasticizer, and abrasion resistance is high. However, the resin may generate harmful gasses such as halogen-based gases in incineration or burning at vehicle fire, which cause environmental problems.

Thus, in recent years, halogen-free resin compositions based on polyolefin-based resins have been developed. In such halogen-free resin compositions, long-term stability of mechanical strength is improved through prevention of decomposition and deterioration by adding various stabilizers such as an oxidation stabilizer and a light stabilizer to the polyolefin-based resins (e.g., see Patent Document 1).

Moreover, by adding an inorganic flame retardant such as a metal hydrate as a flame retardant, flame retardancy can be improved with maintaining the halogen-free property. However, the metal hydrate should be added in a large amount, but the addition invites decrease in properties of the polyolefin-based resins, e.g., a remarkable decline in mechanical properties and flexibility.

[Patent Document 1] JP-A-2006-83328

SUMMARY OF THE INVENTION

Currently, insulated electric wires wherein a conductor is coated with a halogen-free resin composition as mentioned above come into the mainstream. However, actually, in the current wire harness, such insulated electric wires coated with a halogen-free resin composition are also frequently bound and used in a state that the wires were mixed with the insulated electric wires coated with a conventional PCV resin composition. When these insulated electric wires are maintained in such a bound state for a long period of time, there arises a problem that long-term thermal resistance of the halogen-free resin composition decreases. It is presumed that this is because the plasticizer added to the PCV resin composition migrates into the contiguous halogen-free resin composition.

Therefore, an object of the invention is to provide a halogen-free resin composition, an insulated electric wire, and a wire harness, which can maintain long-term thermal resistance without decreasing established mechanical properties, flame retardancy, flexibility, and the like even when the insulated electric wire coated with the halogen-free resin composition is used in a state that it is mixed with an insulated electric wire coated with a PCV resin composition.

For solving the above problem and achieving the object, the inventors provide the following inventions.

(1) A halogen-free resin composition comprising:
100 parts by weight of a base resin consisting of 70 to 90% by weight of a polypropylene-based resin and 30 to 10% by weight of an olefin-based or styrene-based thermoplastic elastomer,
50 to 100 parts by weight of a metal hydrate,
3 to 5 parts by weight of a phenol-based antioxidant,
0.1 to 1.0 part by weight of a salicylic acid-based metal scavenger,
3 to 5 parts by weight of a hydrazine-based metal scavenger, and
1 to 10 parts by weight of a metal oxide.

(2) An insulated electric wire comprising a conductor and an insulator for coating the conductor, wherein the insulator is constituted by the halogen-free resin composition according to the above (1).

(3) A wire harness comprising plurality of insulated electric wires bound therein, wherein at least one of the insulated electric wires is constituted by the insulated electric wire according to the above (2).

As described in the above, the halogen-free resin composition of the invention according to the above (1) contains 100 parts by weight of a base resin consisting of 70 to 90% by weight of a polypropylene-based resin and 30 to 10% by weight of a styrene-based thermoplastic elastomer, 50 to 100 parts by weight of a metal hydrate, 3 to 5 parts by weight of a phenol-based antioxidant, 0.1 to 1.0 part by weight of a salicylic acid-based metal scavenger, 3 to 5 parts by weight of a hydrazine-based metal scavenger, and 1 to 10 parts by weight of a metal oxide, so that the established mechanical properties, flame retardancy, flexibility, and the like are not decreased and the insulated electric wire can maintain long-term thermal resistance even when it is in contact with a PCV resin composition for a long period of time.

In the invention according to the above (2), the insulator of the insulated electric wire comprising a conductor and an insulator for coating the conductor is constituted by the halogen-free resin composition according to the above (1), so that the established mechanical properties, flame retardancy, flexibility, and the like are not decreased and the insulated electric wire can maintain long-term thermal resistance even when it is bound in a mixed state with an insulated electric wire coated with a PCV resin composition. Thus, the use range of insulated electric wires can be extended.

In the invention according to the above (3), at least one insulated electric wire in the wire harness comprising plurality of insulated electric wires bound therein is constituted by the insulated electric wire according to the above (2), so that the established mechanical properties, flame retardancy, flexibility, and the like are not decreased. Furthermore, the insulated electric wire can maintain long-term thermal resistance even when it is bound in a mixed state with an insulated electric wire coated with a PCV resin composition, and thus, for example, can be stably used at the interior of automobiles and the like.

DETAILED DESCRIPTION OF THE INVENTION

The following will describe a halogen-free resin composition according to one embodiment of the invention. The halogen-free resin composition according to one embodiment of the invention comprises 100 parts by weight of a base resin consisting of 70 to 90% by weight of a polypropylene-based resin and 30 to 10% by weight of an olefin-based or styrene-based thermoplastic elastomer, 50 to 100 parts by weight of a metal hydrate, 3 to 5 parts by weight of a phenol-based antioxidant, 0.1 to 1.0 part by weight of a salicylic acid-based metal scavenger, 3 to 5 parts by weight of a hydrazine-based metal scavenger, and 1 to 10 parts by weight of a metal oxide.

Examples of the polypropylene-based resin include propylene homopolymer, propylene-ethylene random copolymer, propylene-α-olefin random copolymer, propylene-ethylene-α-olefin random copolymer, and the like. They may be used singly or two or more thereof may be used in combination. Moreover, the polypropylene-based resin is not limited thereto and may be a polypropylene-based resin other than those compounds unless it contradicts the object of the invention. Furthermore, in the present embodiment, the polypropylene-based resin is non-crosslinked type.

The olefin-based thermoplastic elastomer is composed of polyethylene, polypropylene, or the like as a hard segment and ethylene-propylene-diene rubber (EPDM), ethylene-propylene rubber (EPM), or the like as a soft segment. Examples of the olefin-based thermoplastic elastomer include MILASTOMER (manufactured by Mitsui Chemicals Inc.), Sumitomo TPE (manufactured by Sumitomo Chemical Co., Ltd.), THERMORUN (Mitsubishi Chemical Corporation), and the like. They may be used singly or two or more thereof may be used in combination. Moreover, the olefin-based thermoplastic elastomer is not limited thereto and may be an olefin-based thermoplastic elastomer other than those compounds unless it contradicts the object of the invention.

The styrene-based thermoplastic elastomer is composed of polystyrene or the like as a hard segment and polybutadiene, polyisoprene, or the like as a soft segment. Examples of the styrene-based thermoplastic elastomer include RABALON (Mitsubishi Chemical Corporation), Sumitomo TPE-SB (manufactured by Sumitomo Chemical Co., Ltd.), SEPTON and HYBRAR (Kuraray Co., Ltd.), and the like. They may be used singly or two or more thereof may be used in combination. Moreover, the styrene-based thermoplastic elastomer is not limited thereto and may be an styrene-based thermoplastic elastomer other than those compounds unless it contradicts the object of the invention.

The aforementioned base resin consisting of a polypropylene-based resin and an olefin-based or styrene-based thermoplastic elastomer consists of 70 to 90% by weight of a polypropylene-based resin and 30 to 10% by weight of an olefin-based or styrene-based thermoplastic elastomer. When the amount of the polypropylene-based resin is less than 70% by weight, a sufficient abrasion resistance is not obtained, while when the amount exceeds 90% by weight, there is a risk of decreasing stretchability and impact resistance.

The metal hydrate is added as a flame retardant. Examples of the metal hydrate include magnesium hydroxide, aluminum hydroxide, antimony trioxide, antimony pentoxide, zinc borate, and the like. They may be used singly or two or more thereof may be used in combination. Moreover, the metal hydrate is not limited thereto and may be a metal hydrate other than those compounds unless it contradicts the object of the invention.

The metal hydrate is added in an amount of 50 to 100 parts by weight relative to 100 parts by weight of the base resin. When the amount is less than 50 parts by weight, sufficient flame retardancy is not obtained, while when the amount exceeds 100 parts by weight, the flame retardancy is hardly improved with the increase in the amount and there is a risk of decreasing stretchability and long-term thermal resistance.

Examples of the phenol-based antioxidant include 2,6-di-t-butyl-4-methylphenol, tetrakis[methylene-3-(3',5'-di-t-butyl-4-hydroxyphenyl)propionate]methane, octadecyl-3-(3,5-di-t-butyl-4-hydroxyphenyl)propionate, 3,9-bis{2-[3-(3-t-butyl-4-hydroxy-5-methylphenyl)propionyloxy]-1,1-dimethylethyl}-2,4,8,10-tetraoxaspiro[5.5]undecane, 1,3,5-tris-2-[3-(3,5-di-t-butyl-4-hydroxyphenyl)propionyloxy] ethyl isocyanate, 1,3,5-trimethyl-2,4,6-tris(3,5-di-t-butyl-4-hydroxybenzyl)benzene, tris(3,5-di-t-butyl-4-hydroxybenzyl)isocyanurate, 1,3,5-tris(4-t-butyl-3-hydroxy-2,6-dimethylbenzyl)isocyanurate, pentaerythritol tetrakis[3-(3,5-di-t-butyl-4-hydroxyphenyl)propionate], triethylene glycol-N-bis-3-(3-t-butyl-5-methyl-4-hydroxyphenyl)propionate, 1,6-hexanediol bis[3-(3,5-di-t-butyl-4-hydroxyphenyl)propionate], 2,2-thiobis-diethylene bis[3-(3,5-di-t-butyl-4-hydroxyphenyl)propionate], 2,2'-methylene-bis-(4-methyl-6-t-butylphenol), 2,2'-methylene-bis-(4-ethyl-6-t-butylphenol), 2,2'-methylene-bis-(4,6-di-t-butylphenol), 2,2'-ethylidene-bis-(4,6-di-t-butylphenol) (Cheminox 1129), 2,2'-butylidene-bis-(4-methyl-6-t-butylphenol), 4,4'-butylidene-bis-(3-methyl-6-t-butylphenol), 2-t-butyl-6-(3-t-butyl-2-hydroxyl-5-methylbenzyl)-4-methylphenylacrylate, 2,4-di-t-amyl-6-[1-(3,5-di-t-amyl-2-hydroxyphenyl)ethyl] phenylacrylate, and tocopherols. Specifically, tocopherols include α-tocopherol (5,7,8-trimethyltocol), β-tocopherol (5,8-dimethyltocol), γ-tocopherol (7,8-dimethyltocol), δ-tocopherol (8-methyltocol), and the like. They may be used singly or two or more thereof may be used in combination. Moreover, the phenol-based antioxidant is not limited thereto and may be a phenol-based antioxidant other than those compounds unless it contradicts the object of the invention.

The phenol-based antioxidant is added in an amount of 3 to 5 parts by weight relative to 100 parts by weight of the base resin. When the amount is less than 3 parts by weight, deterioration by oxidation cannot be sufficiently prevented. Even when the amount exceeds 5 parts by weight, the oxidation-inhibiting effect is hardly improved with the increase in the amount and there is a risk that bleeding may occur on the surface when the conductor is coated.

Examples of the salicylic acid-based metal scavenger include N,N'-disalicylidene-ethylenediamine, N,N'-disalicylidene-1,2-propylenediamine, N,N'-disalicylidene-N'-methyl-dipropylenetriamine, 3-(N-salicyloyl)amino-1,2,4-triazole, decamethylenedicarboxylic acid-bis(N'-salicyloylhydrazide), and the like. They may be used singly or two or more thereof may be used in combination. Moreover, the salicylic acid-based metal scavenger is not limited thereto and may be a salicylic acid-based metal scavenger other than those compounds unless it contradicts the object of the invention.

The salicylic acid-based metal scavenger is added in an amount of 0.1 to 1.0 parts by weight relative to 100 parts by weight of the base resin. When the amount is less than 0.1 parts by weight, an auxiliary effect of the antioxidant by scavenging metal cannot be sufficiently obtained. Even when the amount exceeds 1.0 part by weight, the auxiliary effect is hardly improved with the increase in the amount and there is a risk of decreasing stretchability.

Examples of the hydrazine-based metal scavenger include 2-ethoxy-2'-ethyloxanilide, 5-t-butyl-2-ethoxy-2'-ethyloxanilide, N,N-diethyl-N',N'-diphenyloxamide, N,N'-diethyl-N,N'-diphenyloxamide, oxalic acid-bis(benzylidenehydrazide), thiodipropionic acid-bis(benzylidenehydrazide), isophthalic acid-bis(2-phenoxypropionylhydrazide), bis (salicyloylhydrazine), N-salicylidene-N'-salicyloylhydrazone, 2',3-bis{[3-(3,5-di-t-butyl-4-hydroxyphenyl)propionyl]}propionohydrazide, and the like. They may be used singly or two or more thereof may be used in combination. Moreover, the hydrazine-based metal scavenger is not limited thereto and may be a hydrazine-based metal scavenger other than those compounds unless it contradicts the object of the invention.

The hydrazine-based metal scavenger is added in an amount of 3 to 5 parts by weight relative to 100 parts by weight of the base resin. When the amount is less than 3 parts by weight, an auxiliary effect of the antioxidant by scavenging metal cannot be sufficiently obtained. Even when the amount exceeds 5 parts by weight, the auxiliary effect is hardly improved with the increase in the amount and there is a risk that bleeding may occur on the surface when the conductor is coated.

Examples of the metal oxide include zinc oxide (Chinese white), aluminum oxide, magnesium oxide, and the like. They may be used singly or two or more thereof may be used in combination. Moreover, the metal oxide is not limited thereto and may be a metal oxide other than those compounds unless it contradicts the object of the invention.

The metal oxide is added in an amount of 1 to 10 parts by weight relative to 100 parts by weight of the base resin. When the amount is less than 1 part by weight or exceeds 10 parts by weight, there is a risk of decreasing stretchability and long-term thermal resistance.

The halogen-free resin composition having the aforementioned constitution is blended in such a constitution as above. Flame retardancy is improved by incorporating the metal hydrate and decrease in long-term thermal resistance, which is apt to occur particularly when the composition is present in a mixed state with a PCV resin composition, is reduced by incorporating the phenol-based antioxidant, the salicylic acid-based metal scavenger, the hydrazine-based metal scavenger, and the metal oxide. One cause of the decrease in long-term thermal resistance is considered that the plasticizer migrates from the PCV resin composition to the halogen-free resin composition. However, in the invention, even when the plasticizer migrates into the halogen-free resin composition, it is considered that the decrease in long-term thermal resistance is suppressed by the aforementioned antioxidant, the metal scavenger, the metal oxide, and the like.

In this connection, individual components constituting the halogen-free resin composition do not contain halogen and hence do not generate halogen-based gases. Moreover, to the halogen-free resin composition of the present embodiment, a colorant, a lubricant, an antistatic agent, a foaming agent, and the like may be further added in the range where the advantages of the invention is not impaired.

Moreover, the aforementioned halogen-free resin composition is blended and kneaded in such a constitution as above and, as the method, any of various known means can be used. For example, after the components are pre-blended using a high-speed mixing apparatus such as a Henschel mixture in advance, they are kneaded using a known kneader such as a single-screw extruder, a twin-screw extruder, a Bumbury mixer, a kneader, or a roll mill to form a halogen-free resin composition.

The following will describe the insulated electric wire coated with the halogen-free resin composition of the present embodiment and the wire harness. The kind and structure of the insulated electric wire is not limited and examples thereof include a single wire, a flat wire, a shielded wire, and the like. The insulated electric wire comprises a conductor and an insulator for coating the conductor, and the insulator is constituted by the halogen-free resin composition of the invention. The conductor consists of a metal such as copper or aluminum and is formed in a long line shape. The conductor may be a single line or plurality of lines. In this connection, the other insulator or the like may intervene between the conductor and the insulator.

In the aforementioned insulated electric wire, as a method of coating the conductor with the halogen-free resin composition, any of known various means can be used. For example, a common extrusion molding method can be used. As an extruder, a single-screw extruder having a cylinder diameter of 20 to 90 mm and L/D of 10 to 40 is used, which has a screw, a breaker plate, a cross head, a distributor, a nipple, and a die. Then, the halogen-free resin composition is charged into the single-screw extruder set at a temperature at which the halogen-free resin composition is well melted. The halogen-free resin composition is melted and kneaded by the screw and a constant amount is fed to the cross head through the breaker. The melted halogen-free resin composition flows onto the periphery of the nipple by the distributor and is extruded on the periphery of the conductor in a coated state by the die to afford an insulated electric wire.

Then, a wire harness is obtained by binding plurality of the insulated electric wires. At the terminal end of the insulated electric wire, for example a connector is attached. The connector comprises a terminal metal fitting obtained by folding a steel plate and a connector housing made of a synthetic resin. The terminal metal fitting is electrically connected with the conductor and is housed in the connector housing. The connector fits with a connector provided on the other electronic device and the wire harness transmits electric power, regulating signals, or the like to the electronic device. In this connection, all of plurality of the insulated electric wires are not necessarily the insulated electric wires coated with the halogen-free resin composition of the invention and an insulated electric wire coated with PCV resin composition can be mixed.

According to the present embodiment, the halogen-free resin composition comprises 100 parts by weight of a base resin consisting of 70 to 90% by weight of a polypropylene-based resin and 30 to 10% by weight of a styrene-based thermoplastic elastomer, 50 to 100 parts by weight of a metal hydrate, 3 to 5 parts by weight of a phenol-based antioxidant, 0.1 to 1.0 parts by weight of a salicylic acid-based metal scavenger, 3 to 5 parts by weight of a hydrazine-based metal scavenger, and 1 to 10 parts by weight of a metal oxide, so that the established mechanical properties, flame retardancy, flexibility, and the like are not decreased and the insulated electric wire can maintain long-term thermal resistance even when it is in contact with a PCV resin composition for a long period of time.

Since the insulator of the insulated electric wire comprising a conductor and an insulator for coating the conductor is constituted by the halogen-free resin composition according to claim, so that the established mechanical properties, flame retardancy, flexibility, and the like are not decreased and the insulated electric wire can maintain long-term thermal resistance even when it is bound in a mixed state with an insulated electric wire coated with a PCV resin composition. Thus, the use range of insulated electric wires can be extended.

At least one insulated electric wire in the wire harness comprising plurality of insulated electric wires is constituted by the insulated electric wire according to the invention, so that the established mechanical properties, flame retardancy, flexibility, and the like are not decreased. Furthermore, the insulated electric wire can maintain long-term thermal resistance even when it is bound in a mixed state with an insulated electric wire coated with a PCV resin composition, and thus, for example, can be stably used at the interior of automobiles and the like.

EXAMPLES

The following will illustrate specific Examples. According to the parts by weight shown in Table 1 and Table 2, a polypropylene-based resin, a styrene-based thermoplastic elastomer, a metal hydrate, a phenol-based antioxidant, a salicylic acid-based metal scavenger, a hydrazine-based metal scavenger, and a metal oxide were blended to prepare a halogen-free resin composition. After mixed in a Henschel mixer having a volume of 20 L, the composition was kneaded at a die temperature of 200° C. using an identical-direction twin-screw extruder having a diameter of 40 mm. Thereafter, the product was charged into an electric wire extruder (diameter 60 mm, L/D=24.5, FF screw) and extruded onto a conductor having a conductor area of 0.3395 mM$^2$ (strand constitution: 0.2485 mm×7 twisted strands) at an extrusion rate of 600 mm/min and an extrusion temperature of 230° C. to prepare an insulated electric wire having a finished outer diameter of 1.20 mm. The resulting insulated electric wire was subjected to the following evaluation tests and the results are summarized in the columns of evaluation in Tables 1 and 2.

Specific trade names, suppliers, and the like of the polypropylene-based resin, the styrene-based thermoplastic elastomer, the metal hydrate, the phenol-based antioxidant, the salicylic acid-based metal scavenger, the hydrazine-based metal scavenger, and the metal oxide are described below.

Polypropylene-based resin:

propylene homopolymer, trade name PS201A (MFR=0.5 g/10 min), manufactured by SunAllomer Ltd.

Olefin-based thermoplastic elastomer:

trade name THERMORUN Z102B, manufactured by Mitsubishi Chemical Corporation

Metal hydrate:

magnesium hydroxide, trade name KISUMA 5A (average particle diameter 0.8 μm), manufactured by Kyowa Chemical Industry Co., Ltd.

Phenol-based antioxidant:

pentaerythritol tetrakis[3-(3,5-di-t-butyl-4-hydroxyphenyl) propionate], trade name Irganox 1010, manufactured by Ciba Specialty Chemicals Co. Ltd.

Salicylic acid-based metal scavenger:

3-(N-salicyloyl)amino-1,2,4-triazole, trade name ADEKA STAB CDA-1, manufactured by ADEKA Co.

Hydrazine-based metal scavenger:

2',3-bis{[3-(3,5-di-t-butyl-4-hydroxyphenyl)propionyl]}-propionohydrazide, trade name Iraganox MD 1024, manufactured by Ciba Specialty Chemicals Co. Ltd.

Metal oxide:

zinc oxide, trade name zinc oxide second class, manufactured by Mitsui Mining & Smelting Co., Ltd.

(Evaluation of Tensile Elongation)

It was conducted in accordance to JIS B7721. Namely, an insulated electric wire was cut into a length of 150 mm and the conductor was removed to form a tubular test piece composed of a halogen-free resin composition alone. Thereafter, lines were marked at a 50 mm interval at the central part. Both terminals of the test pieces were then attached to the chuck of a tensile testing machine at room temperature. Subsequently, the test piece was stretched at a tensile rate of 25 to 500 mm/min and the distance between the marked lines was measured. When the elongation was 500% or more, it was evaluated to be qualified (◯) and, when the elongation was less than 500%, it was evaluated to be disqualified (x).

(Evaluation of Flame Retardancy)

An insulated electric wire having a length of 600 mm or more was fixed in a calm chamber at a slant at an angle of 45°. Then, reducing flame was applied to the wire at the part 500 mm±5 mm apart from the upper end for 15 seconds with a bunsen burner and the time required for quenching was measured. When the time required for quenching was within 70 seconds, it was evaluated to be qualified (◯) and, when the time exceeded 70 seconds, it was evaluated to be disqualified (x).

(Evaluation of Abrasion Resistance)

It was conducted using a scrape abrasion testing machine. Namely, an insulated electric wire having a length of 1 m was placed on a sample holder and was fixed with a clamp. Then, a plunge having a piano wire having a diameter of 0.45 mm at the tip was applied to the insulated electric wire under a load of 7N using a pressurizing member and was reciprocated (reciprocation distance: 14 mm). The number of reciprocation times until the piano wire of the plunge touched the conductor due to abrasion of the halogen-free resin composition of the insulated electric wire was counted. When the number of times was 300 or more, it was evaluated to be qualified (◯) and, when the number was less than 300, it was evaluated to be disqualified (x).

[Evaluation of Bleeding]

The surface of an insulated electric wire was visually observed. When no white powdering was observed, it was evaluated to be qualified (◯) and, when white powering was observed, it was evaluated to be disqualified (x).

(Evaluation of Long-Term Thermal Resistance 1)

An insulated electric wire was allowed to stand at 150° C. for 100 hours to effect aging under heating. Thereafter, when no crack was generated on the halogen-free resin composition due to self-twisting, it was evaluated to be qualified (◯) and, when a crack was generated, it was evaluated to be disqualified (x).

(Evaluation of Long-Term Thermal Resistance 2)

An article obtained by wrapping a polyvinyl chloride-based pressure-sensitive adhesive tape around the periphery of a wire bundle consisting of, in a mixed state, an arbitrary number of an insulated electric wire of the invention and an insulated electric wire wherein a conductor was coated with a PCV resin composition was allowed to stand at 150° C. for 100 hours to effect aging under heating. Thereafter, when no crack was generated on the halogen-free resin composition due to self-twisting, it was evaluated to be qualified (◯) and, when a crack was generated, it was evaluated to be disqualified (x).

TABLE 1

|  |  | Examples | | | | | |
|---|---|---|---|---|---|---|---|
|  |  | 1 | 2 | 3 | 4 | 5 | 6 |
| Component | Polypropylene-based resin | 70 | 70 | 70 | 70 | 90 | 70 |
|  | Olefin-based thermoplastic elastomer | 30 | 30 | 30 | 30 | 10 | 30 |

TABLE 1-continued

|  |  | Examples | | | | | |
|---|---|---|---|---|---|---|---|
|  |  | 1 | 2 | 3 | 4 | 5 | 6 |
|  | Metal hydrate | 75 | 75 | 75 | 75 | 75 | 50 |
|  | Phenol-based antioxidant | 4 | 4 | 4 | 4 | 4 | 4 |
|  | Salicylic acid-based metal scavenger | 0.1 | 0.5 | 0.1 | 0.5 | 0.5 | 0.5 |
|  | Hydrazine-based metal scavenger | 3 | 3 | 5 | 5 | 3 | 5 |
|  | Metal oxide | 5 | 5 | 5 | 5 | 5 | 5 |
| Evaluation | Tensile elongation | ○ | ○ | ○ | ○ | ○ | ○ |
|  | Flame retardancy | ○ | ○ | ○ | ○ | ○ | ○ |
|  | Abrasion resistance | ○ | ○ | ○ | ○ | ○ | ○ |
|  | Bleeding | ○ | ○ | ○ | ○ | ○ | ○ |
|  | Long-term thermal resistance 1 | ○ | ○ | ○ | ○ | ○ | ○ |
|  | Long-term thermal resistance 2 | ○ | ○ | ○ | ○ | ○ | ○ |

TABLE 2

|  |  | Examples | | | | | |
|---|---|---|---|---|---|---|---|
|  |  | 7 | 8 | 9 | 10 | 11 | 12 |
| Component | Polypropylene-based resin | 70 | 70 | 70 | 70 | 70 | 70 |
|  | Olefin-based thermoplastic elastomer | 30 | 30 | 30 | 30 | 30 | 30 |
|  | Metal hydrate | 75 | 75 | 75 | 75 | 75 | 75 |
|  | Phenol-based antioxidant | 4 | 3 | 5 | 4 | 4 | 4 |
|  | Salicylic acid-based metal scavenger | 0.5 | 0.5 | 0.5 | 1 | 0.5 | 0.5 |
|  | Hydrazine-based metal scavenger | 3 | 3 | 3 | 3 | 3 | 3 |
|  | Metal oxide | 5 | 5 | 5 | 5 | 1 | 10 |
| Evaluation | Tensile elongation | ○ | ○ | ○ | ○ | ○ | ○ |
|  | Flame retardancy | ○ | ○ | ○ | ○ | ○ | ○ |
|  | Abrasion resistance | ○ | ○ | ○ | ○ | ○ | ○ |
|  | Bleeding | ○ | ○ | ○ | ○ | ○ | ○ |
|  | Long-term thermal resistance 1 | ○ | ○ | ○ | ○ | ○ | ○ |
|  | Long-term thermal resistance 2 | ○ | ○ | ○ | ○ | ○ | ○ |

Comparative Examples

The following will show Comparative Examples. According to the parts by weight shown in Table 3 and Table 4, a polypropylene-based resin, a styrene-based thermoplastic elastomer, a metal hydrate, a phenol-based antioxidant, a salicylic acid-based metal scavenger, a hydrazine-based metal scavenger, and a metal oxide are blended to prepare a halogen-free resin composition, which was then blended and kneaded. Thereafter, a conductor was coated with the resulting halogen-free resin composition to prepare an insulated electric wire. The resulting insulated electric wire was subjected to the following evaluation tests and the results are summarized in the columns of evaluation in Tables 3 and 4. The method of preparing the halogen-free resin composition and the compounds used, the method of preparing the insulated electric wire, the methods of the evaluation tests, and the like are the same as in the above Examples, so that the details were omitted.

TABLE 3

|  |  | Comparative Examples | | | | | |
|---|---|---|---|---|---|---|---|
|  |  | 1 | 2 | 3 | 4 | 5 | 6 |
| Component | Polypropylene-based resin | 30 | 70 | 70 | 70 | 70 | 70 |
|  | Olefin-based thermoplastic elastomer | 70 | 30 | 30 | 30 | 30 | 30 |
|  | Metal hydrate | 75 | 30 | 150 | 75 | 75 | 75 |
|  | Phenol-based antioxidant | 4 | 4 | 4 | 2 | 2 | 10 |
|  | Salicylic acid-based metal scavenger | 0.5 | 0.5 | 0.5 | 0.1 | 0.5 | 0.5 |
|  | Hydrazine-based metal scavenger | 3 | 3 | 3 | 1 | 3 | 3 |
|  | Metal oxide | 5 | 5 | 5 | 0 | 5 | 5 |
| Evaluation | Tensile elongation | ○ | ○ | X | ○ | ○ | ○ |
|  | Flame retardancy | ○ | X | ○ | ○ | ○ | ○ |

TABLE 3-continued

| | | Comparative Examples | | | | | |
|---|---|---|---|---|---|---|---|
| | | 1 | 2 | 3 | 4 | 5 | 6 |
| | Abrasion resistance | X | X | ○ | ○ | ○ | ○ |
| | Bleeding | ○ | ○ | ○ | ○ | ○ | X |
| | Long-term thermal resistance 1 | ○ | ○ | X | ○ | X | ○ |
| | Long-term thermal resistance 2 | X | X | X | X | X | ○ |

TABLE 4

| | | Comparative Examples | | | | | |
|---|---|---|---|---|---|---|---|
| | | 7 | 8 | 9 | 10 | 11 | 12 |
| Component | Polypropylene-based resin | 70 | 70 | 70 | 70 | 70 | 70 |
| | Olefin-based thermoplastic elastomer | 30 | 30 | 30 | 30 | 30 | 30 |
| | Metal hydrate | 75 | 75 | 75 | 75 | 75 | 75 |
| | phenol-based antioxidant | 4 | 4 | 4 | 4 | 4 | 4 |
| | Salicylic acid-based metal scavenger | 0.05 | 2 | 0.5 | 0.5 | 0.5 | 0.5 |
| | hydrazine-based metal scavenger | 3 | 3 | 2 | 10 | 3 | 3 |
| | Metal oxide | 5 | 5 | 5 | 5 | 0.5 | 15 |
| Evaluation | Tensile elongation | ○ | X | ○ | ○ | ○ | X |
| | Flame retardancy | ○ | ○ | ○ | ○ | ○ | ○ |
| | Abrasion resistance | ○ | ○ | ○ | ○ | ○ | ○ |
| | Bleeding | ○ | ○ | ○ | X | ○ | ○ |
| | Long-term thermal resistance 1 | X | ○ | X | ○ | X | X |
| | Long-term thermal resistance 2 | X | ○ | X | ○ | X | X |

As shown in Examples 1 to 12 in Tables 1 and 2, the insulated electric wires of Examples coated with the halogen-free resin composition of the invention afforded good results in all of tensile elongation, flame retardancy, abrasion resistance, bleeding, and long-term thermal resistance 1 and thus, it was confirmed that they had sufficient mechanical properties, flame retardancy, and flexibility. Furthermore, in long-term thermal resistance 2, the long-term thermal resistance did not decrease even when the wires were bound and used in a state where they were in contact with the insulated electric wires coated with a PCV resin composition, that is, in a state that they were mixed with the insulated electric wires coated with a PCV resin composition.

On the other hand, as shown in Comparative Examples 1 to 3 and 5 to 12 in Tables 3 and 4, the insulated electric wires of Comparative Examples did not afford good result(s) in at least one of tensile elongation, flame retardancy, abrasion resistance, bleeding, and long-term thermal resistance 1 and thus, they did not have sufficient mechanical properties, flame retardancy, and/or flexibility. Moreover, as shown in Comparative Example 4, even when the wire has sufficient mechanical properties, flame retardancy, and flexibility, long-term thermal resistance decreased when the wire was bound and used in a state where it was mixed with the insulated electric wire coated with a PCV resin composition.

The aforementioned embodiments merely illustrate representative modes of the invention and the invention should not be construed as being limited to the embodiments. That is, the invention can be implemented with various changes and modifications without departing from the gist of the invention.

This application is based on Japanese patent application No. 2007-075144 filed on Mar. 22, 2007, the entire contents thereof being hereby incorporated by reference.

What is claimed is:

1. A halogen-free resin composition comprising:
   100 parts by weight of a base resin consisting of 70 to 90% by weight of a polypropylene-based resin and 30 to 10% by weight of an olefin-based or styrene-based thermoplastic elastomer,
   50 to 100 parts by weight of a metal compound, wherein the metal compound is selected from the group consisting of magnesium hydroxide, aluminum hydroxide, antimony trioxide, antimony pentoxide, and zinc borate,
   3 to 5 parts by weight of a phenol-based antioxidant,
   0.1 to 1.0 part by weight of a salicylic acid-based metal scavenger,
   3 to 5 parts by weight of a hydrazine-based metal scavenger, and
   1 to 10 parts by weight of a metal oxide selected from the group consisting of zinc oxide, aluminum oxide, and magnesium oxide.

2. An insulated electric wire comprising a conductor and an insulator for coating the conductor, wherein the insulator is constituted by the halogen-free resin composition according to claim 1.

3. A wire harness comprising plurality of insulated electric wires bound therein, wherein at least one of the insulated electric wires is constituted by the insulated electric wire according to claim 2.

* * * * *